(12) United States Patent
Choi et al.

(10) Patent No.: US 11,601,005 B2
(45) Date of Patent: Mar. 7, 2023

(54) HYBRID ELECTRIC VEHICLE AND CHARGE CONTROL METHOD THEREFOR

(71) Applicants: HYUNDAI MOTOR COMPANY, Seoul (KR); KIA MOTORS CORPORATION, Seoul (KR)

(72) Inventors: Sung Hoon Choi, Suwon-si (KR); Young Un Kim, Suwon-si (KR); Yu Hyun Sung, Seoul (KR); Jeong Min Shin, Suwon-si (KR); Dong Jin Nam, Anyang-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 194 days.

(21) Appl. No.: 17/071,128

(22) Filed: Oct. 15, 2020

(65) Prior Publication Data
US 2021/0384756 A1    Dec. 9, 2021

(30) Foreign Application Priority Data
Jun. 9, 2020    (KR) .......................... 10-2020-0069630

(51) Int. Cl.
*H02J 7/00*     (2006.01)
*H02J 7/14*     (2006.01)
*B60L 58/12*    (2019.01)

(52) U.S. Cl.
CPC ............ *H02J 7/1446* (2013.01); *B60L 58/12* (2019.02)

(58) Field of Classification Search
None
See application file for complete search history.

(56) References Cited

U.S. PATENT DOCUMENTS

| | | | |
|---|---|---|---|
| 2012/0081070 A1* | 4/2012 | Wook ..................... | B60W 20/00 320/109 |
| 2015/0120118 A1* | 4/2015 | Kim ........................ | B60L 58/34 701/22 |
| 2016/0272191 A1* | 9/2016 | Atluri ..................... | B60K 6/485 |
| 2018/0022341 A1* | 1/2018 | Jang ....................... | B60W 20/14 701/22 |
| 2019/0184810 A1* | 6/2019 | Yun ........................ | B60W 20/20 |

* cited by examiner

*Primary Examiner* — Arun C Williams
(74) *Attorney, Agent, or Firm* — Lempia Summerfield Katz LLC

(57) ABSTRACT

A hybrid electric vehicle (HEV) includes: a battery, a hybrid starter generator (HSG) starting an engine, and a controller that identifies a state of charge (SOC) of the battery upon when a reverse gear input is detected, determines whether to charge the battery by the HSG based on the identified SOC of the battery. In particular, the controller controls battery charging in a charging control mode based on a SOC level of the battery when it is determined that the HSG needs to charge the battery.

15 Claims, 5 Drawing Sheets

HYBRID ELECTRIC VEHICLE AND CHARGE CONTROL METHOD THEREFOR

CROSS-REFERENCE TO RELATED APPLICATION

This application claims priority to and the benefit of Korean Patent Application No. 10-2020-0069630, filed on Jun. 9, 2020, the entire contents of which are incorporated herein by reference.

FIELD

The present disclosure relates to a Hybrid Electric Vehicle (HEV) and a charging control method therefor.

BACKGROUND

The statements in this section merely provide background information related to the present disclosure and may not constitute prior art.

A HEV refers to a vehicle using two or more types of different driving sources, and generally means a vehicle driven by an engine generating driving power through burning fuel and a motor generating driving power using electric energy of a battery. Many new technologies are applied to the HEV to increase fuel efficiency and transmission efficiency while a vehicle weight is reduced. Nowadays, technologies that increase transmission efficiency and fuel economy, and reduce weight and cost, are attracting attention, by removing the reverse gear of the transmission mounted on the HEV.

When parts associated with a reverse gear is removed to improve the efficiency and to reduce the cost and weight of the HEV, a motor is reversely driven after the first gear is engaged upon inputting the reverse gear. At this time, the motor receives power from a high voltage battery and then is reversely driven. When the state of charge (SOC) of a battery is sufficient, the motor is reversed sufficiently using the energy of the battery in a situation where an engine is stopped (OFF). On the other hand, when the SOC of the battery is low, the engine is operated (ON) to supply charging energy to the battery through the regeneration operation of a hybrid starter generator (HSG), and then the charged energy is supplied to the motor; accordingly, it is possible to reverse a vehicle.

In a situation where the battery SOC is determined to be low SOC, the battery charging technology uses the conventional HSG in a single mode to charge the high voltage battery. When a user reverses the vehicle under various environmental conditions, the HSG charging control technology in the single mode not only prevents smoothly reverse driving, but also has poor charging efficiency.

SUMMARY

An aspect of the present disclosure provides a HEY that identifies battery SOC and controls battery charging by changing the charging control strategy of a HSG depending on a battery SOC level, upon inputting a reverse gear in the HEV equipped with transmission in which the reverse gear is removed, and a charging control method therefor.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a hybrid electric vehicle (HEV) includes a battery, a hybrid starter generator (HSG) starting an engine, and a controller identifying a state of charge (SOC) of the battery upon inputting a reverse gear to determine whether the HSG charges the battery and controlling battery charging in a charging control mode according to an SOC level of the battery when it is determined that the battery needs to be charged by the HSG.

The controller determines that the battery needs to be charged by the HSG, when the SOC of the battery is less than a first reference value.

When it is determined that the HSG needs to charge the battery, the controller operates the engine and the HSG in a regeneration mode in which a regeneration control is executed in the HSG so as to charge the battery.

The controller determines that the charging control mode is a maximum charging mode, when the SOC of the battery is less than a second reference value.

The second reference value is set to a value less than the first reference value.

The controller operates the HSG at a maximum chargeable point during the battery charging in the maximum charging mode.

The controller determines that the charging control mode is a maximum efficiency mode, when the SOC of the battery is not less than the second reference value.

The controller operates the HSG at a maximum efficiency point during the battery charging in the maximum efficiency mode.

The controller determines whether the SOC of the battery reaches the second reference value, at a predetermined interval during the battery charging in the maximum charging mode.

The controller switches to the charging control mode at a maximum chargeable point when the SOC of the battery reaches the second reference value.

According to an aspect of the present disclosure, a charging control method of a HEV includes: identifying, by a controller, a SOC of a battery when a reverse gear input is detected; determining, by the controller whether to charge the battery by a HSG based on the identified SOC of the battery; and controlling battery charging in a charging control mode based on a SOC level of the battery when it is determined that the HSG needs to charge the battery.

The determining of whether the HSG charges the battery includes determining that the battery needs to be charged by the HSG when the SOC of the battery is less than a first reference value and operating an engine and the HSG in a regeneration mode when it is determined that the HSG charges the battery.

The controlling of the battery charging includes charging the battery in a maximum charging mode when the SOC of the battery is equal to or greater than a second reference value.

The controlling of the battery charging further includes operating the HSG at a maximum chargeable point during the battery charging in the maximum charging mode.

The controlling of the battery charging further includes controlling the battery charging in a maximum efficiency mode when the SOC of the battery is not less than the second reference value.

The controlling of the battery charging further includes operating the HSG at a maximum efficiency point during the battery charging in a maximum efficiency mode.

The controlling of the battery charging further includes determining whether the SOC of the battery reaches the second reference value, at a predetermined interval during the battery charging in the maximum charging mode and switching to the charging control mode at the maximum chargeable point when the SOC of the battery reaches the second reference value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
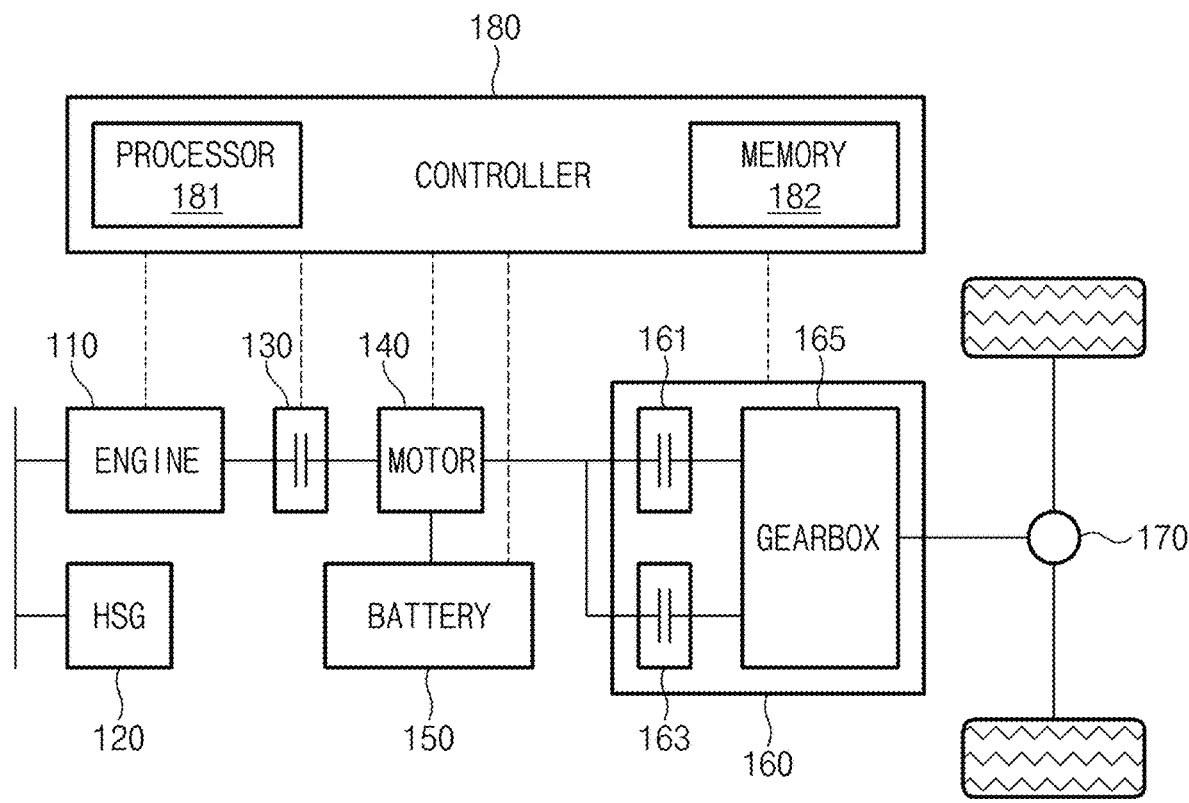
FIG. 1 is a block diagram of a HEV in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing exemplary forms of the present disclosure, a detailed description of well-known features or functions will be ruled out in order not to unnecessarily obscure the gist of the present disclosure.

In describing the components of the forms according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
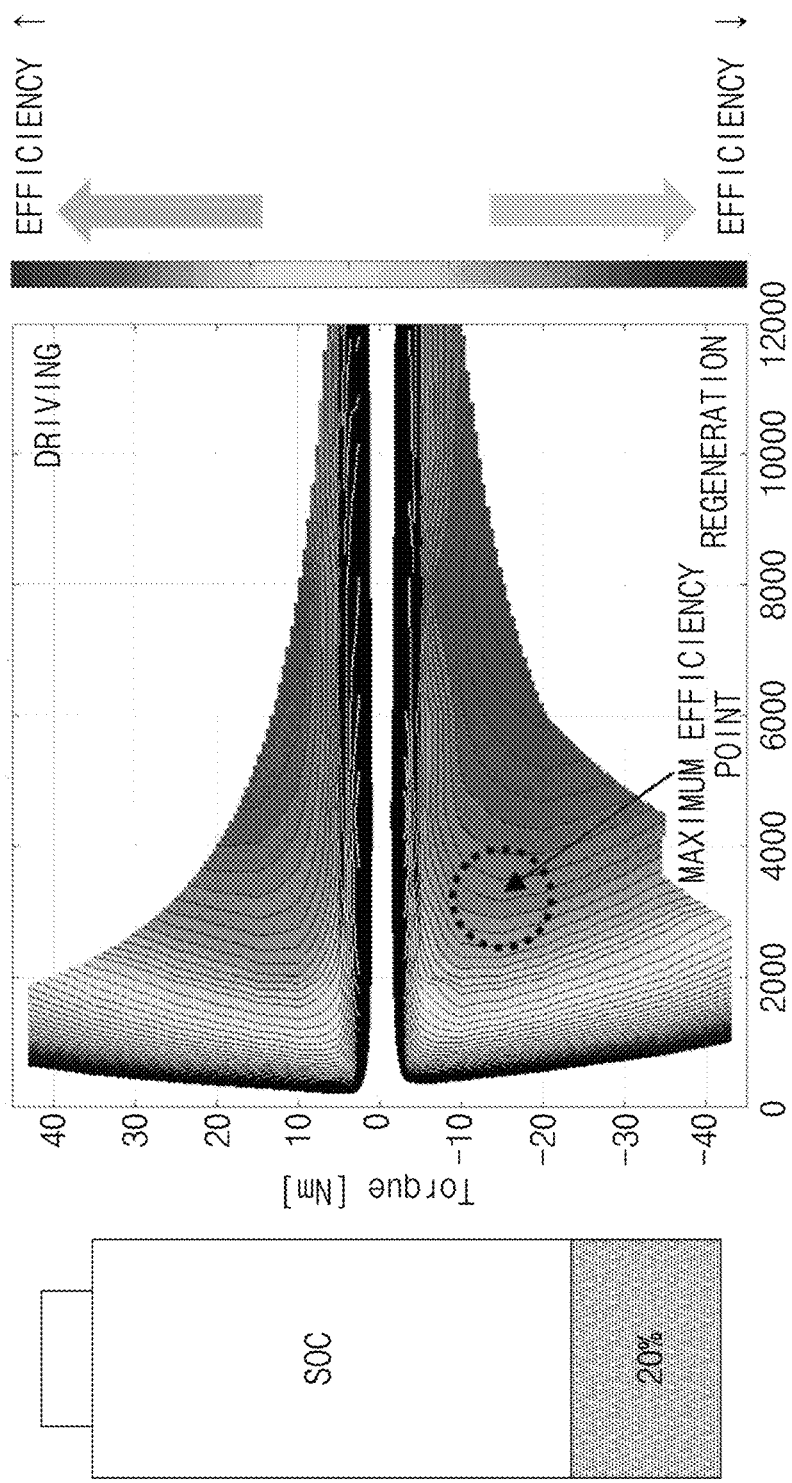
FIG. 2 is a graph illustrating an output torque according to a rotational speed of a HSG at a first SOC level according to one form of the present disclosure.
Figure 3:
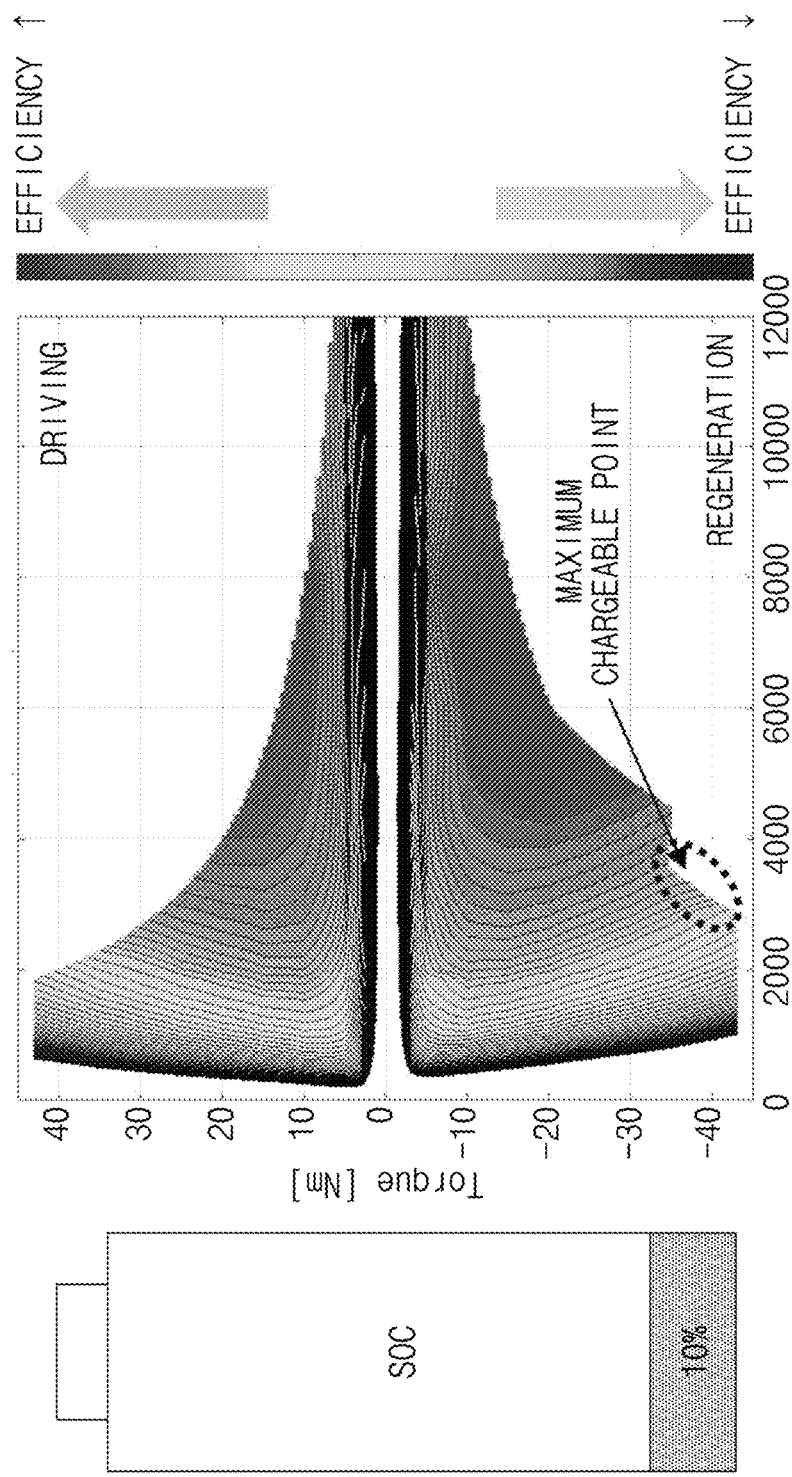
FIG. 3 is a graph illustrating an output torque according to a rotational speed of a HSG at a second SOC level according to one form of the present disclosure.

FIG. 1 is a block diagram of a HEV according to one form of the present disclosure. FIG. 2 is a graph illustrating an output torque according to a rotational speed of a HSG at a first SOC level according to another form of the present disclosure. FIG. 3 is a graph illustrating an output torque according to a rotational speed of a HSG at a second SOC level in one form of the present disclosure. Herein, the REV may be a Transmission Mounted Electric Device (TMED)-type HEV and/or plug-in hybrid electric vehicle (PHEV), and double clutch transmission (DCT) is applied to the TMED Referring to FIG. 1, the REV may include an engine 110, a Hybrid Starter Generator (HSG) 120, an engine clutch 130, a motor 140, a battery 150, a transmission 160, a differential 170, and a controller 180.

The engine 110 burns fuel to generate power required to drive a vehicle. Various engines known as a gasoline engine, a diesel engine, or the like may be used as the engine 110. In the engine 110, the output torque (engine torque or engine power) is controlled under the control of the controller 180.

The HSG 120 may be mounted on the engine 110 and may start by cranking the engine 110. The HSG 120 may generate electric energy by operating as a generator in a state where the engine 110 is started. The electrical energy generated by the HSG 120 may be used to charge the battery 150.

The engine clutch 130 is interposed between the engine 110 and the motor 140 to engage or disengage the power (output torque) of the engine 110. The engine clutch 130 delivers or blocks the power (engine power) generated by the engine 110 to the driving wheel (vehicle wheel) through engagement or disengagement.

The motor 140 receives power from the battery 150 to generate power (motor power) and then delivers the motor power to the driving wheel. The output torque (motor torque or motor power) of the motor 140 is adjusted as the motor 140 operates under the control of the controller 180. The motor 140 changes the rotation direction and rotational speed (Revolution Per Minute (RPM)) under the instructions of the controller 180. The motor 140 may be used as a generator that charges the battery 150 by generating reverse electromotive force when state of charge (SOC) is insufficient or during regenerative braking.

The battery 150 supplies the power required to drive the vehicle, and is implemented with a high voltage battery. A power converter (not illustrated) may be interposed between the motor 140 and the battery 150. The power converter (not illustrated) converts and supplies the voltage output from a vehicle battery (not illustrated) into a motor driving voltage. The battery 150 may be charged by the regenerative energy generated by the motor 140.

The transmission 160 transmits and outputs motor power or engine power and motor power to a wheel (driving wheel). The transmission 160 is a DCT in which the reverse gear (R gear) is removed, and includes a first clutch 161, a second clutch 163, and a gearbox 165. The first clutch 161 is directly connected to the first transmission input shaft on which odd gears are installed, and delivers power to the first transmission input shaft. The second clutch 163 is directly connected to the second transmission input shaft on which even gears are installed, and delivers power to the second transmission input shaft. The gearbox 165 includes a first shift actuator and a pair that engages or disengages odd gears such as the first gear, the third gear, and the fifth gear, to the first transmission input shaft, and a second shift actuator that engages or disengages even gears such as the second gear, the fourth gear, and the sixth gear, to the second transmission input shaft.

The differential 170 delivers the sum of the output torque of the transmission 160 and the output torque of the motor 140 as a driving torque to the wheels. The differential 170 distributes and delivers the power generated by the engine 110 and the motor 140 to both wheels.

The controller 180 controls the overall operation of a vehicle. The controller 180 may include at least one processor 181 and memory 182. The processor 181 may be a semiconductor device that processes instructions stored in the memory 182. The processor 181 may be implemented with an Application Specific Integrated Circuit (ASIC), a Digital Signal Processor (DSP), a Programmable Logic Devices (PLD), Field Programmable Gate Arrays (FPGAs), a Central Processing Unit (CPU), micro-controllers, and/or microprocessors. The memory 182 may include various types of volatile or nonvolatile storage media. For example, the memory 182 may include storage media (recording media), such as a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a cache, and/or a removable disc.

The controller 180 may transmit and receive data with electronic control devices in a vehicle connected through a vehicle network. Herein, Controller Area Network (CAN), FlexRay, Media Oriented Systems Transport (MOST) network, Local Interconnect Network (LIN), and/or Ethernet may be used as the vehicle network. In addition, the controller 180 may collect vehicle information through sensors (e.g., a speed sensor and a shift lever position sensor) mounted on the vehicle.

The controller 180 may switch the driving mode through engagement or disengagement of the engine clutch 130. The driving mode is divided into an electric vehicle (EV) mode and a HEV mode. The EV mode is to drive a vehicle with only the motor power by disengaging the engine clutch 130 to cut off engine power; the HEV mode is to drive the vehicle with both the engine power and the motor power by engaging the engine clutch 130.

The controller 180 may recognize the shift gear input by a driver during driving. The controller 180 may detect the gear shift (change) through a sensor mounted on the vehicle when the driver operates a driver manipulator such as a shift lever, a shift button, or the like.

The controller 180 identifies the SOC (hereinafter referred to as "battery SOC") of the battery 150 when the reverse gear (R gear) is input by a driver. The controller 180 may measure the battery SOC using a sensor (e.g., a current sensor and/or a voltage sensor) installed in the battery 150 when there is a reverse input from the driver manipulator.

The controller 180 may determine whether a battery charging (hereinafter, HSG charging) of the HSG 120 is desired, based on the battery SOC. Herein, the HSG charging means that the battery 150 is charged using electrical energy generated by the HSG 120. When the battery SOC is less than a first reference value (e.g., 25%), the controller 180 determines that the HSG charging is desired, and determines the HSG charging. When the battery SOC is not less than the predetermined first reference value, the controller 180 determines that the HSG charging is unnecessary, and does not determine the HSG charging. When the HSG charging is not determined, the controller 180 controls a reverse operation in a normal mode. In other words, the controller 180 instructs the motor 140 to operate reversely. Under the instructions of the controller 180, the motor 140 changes the direction of rotation from forward to reverse to switch the driving direction of the vehicle from forward to reverse. When reverse control is performed in the normal mode, the controller 180 does not operate the HSG 120. That is, the controller 180 reversely drives the motor 140 with the driving voltage supplied from the battery 150 in a state where the engine 110 is turned off (off state).

The controller 180 starts the HSG charging control when the HSG charging is determined. The controller 180 operates the engine 110 (on state), and thus operates the HSG 120 to reversely drive the motor 140. The controller 180 determines the HSG charging control mode depending on the SOC level of the battery 150 and controls the battery charging in the determined HSG charging control mode. The controller 180 may determine whether the battery SOC is less than a predetermined second reference value (e.g., 15%), and may determine the HSG charging control mode depending on the determination result. When the battery SOC is less than the second reference value, the controller 180 determines that the HSG charging control mode is the HSG maximum charging mode. When the battery SOC is not less than the second reference value, the controller 180 determines that the HSG charging control mode is the HSG maximum efficiency mode.

When it is determined that the HSG charging control mode is the HSG maximum efficiency mode, the controller 180 controls the battery charging in the HSG maximum efficiency mode. In other words, when the battery SOC is less than the first reference value and is not less than the second reference value, the controller 180 operates the engine 110 at the maximum efficiency point to drive the motor of the HSG 120, thereby performing the battery charging. Referring to FIG. 2, when the battery charging is controlled in a HSG maximum efficiency mode, the HSG 120 may be operated at the point where the maximum regenerative efficiency is capable of being achieved at the specified motor rotational speed [RPM] of the HSG (120), thereby maximizing the charging efficiency.

When it is determined that the HSG charging control mode is the HSG maximum charging mode, the controller 180 controls the battery charging in the HSG maximum charging mode. That is, when the battery SOC is less than the first reference value and less than the second reference value, the controller 180 controls the regeneration operation of the HSG 120 by operating the engine 110 at a maximum chargeable point, thereby charging the battery 150 with the regenerative energy of the HSG 120. Referring to FIG. 3, when the battery charging is controlled in the HSG maximum charging mode, the HSG 120 may be operated at the HSG maximum regeneration point, that is, the HSG maximum chargeable point, thereby maximizing the charging amount of the battery and minimizing the charging time.

When the battery SOC reaches the second reference value during battery charging in the HSG maximum charging mode, the controller 180 changes the HSG charging control mode from the HSG maximum charging mode to the HSG maximum efficiency mode.

Figure 4:
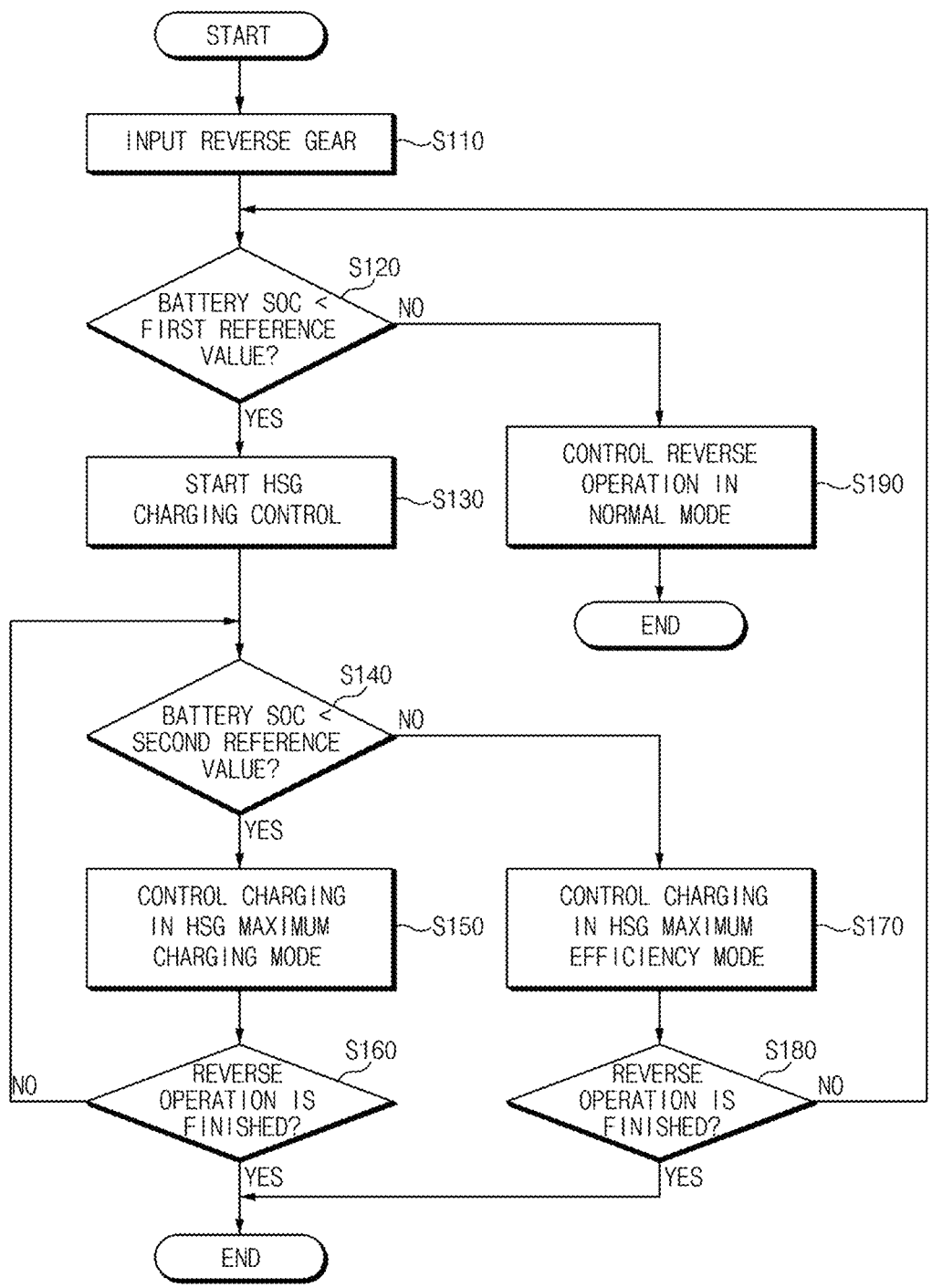
FIG. 4 is a flowchart illustrating a charging control method of a HEV according to another form of the present disclosure.

FIG. 4 is a flowchart illustrating a charging control method of a HEV according to one form of the present disclosure.

Referring to FIG. 4, the controller 180 receives a reverse command while driving a vehicle (S110). When the driver shifts a reverse gear using a driver manipulator such as a shift lever, a shift button, or the like, the controller 180 may recognize the corresponding shift gear input through a sensor in the vehicle. When the reverse gear is input, the controller 180 identifies the battery SOC, using the sensor installed in the battery 150.

The controller 180 determines whether the battery SOC is less than the first reference value (e.g., 25%) (S120). Herein, the first reference value may be set in advance by a system designer. The controller 180 may determine whether the charging is made by the HSG 120, based on the battery SOC. When the battery SOC is less than the first reference value, the controller 180 determines the HSG charging; when the battery SOC is not less than the first reference value, the controller 180 does not determine the HSG charging.

The controller 180 starts the HSG charging control when the battery SOC is less than the first reference value (S130). When the HSG charging is determined, the controller 180 operates the engine 110 through the HSG 120 and drives the motor 140 in the reverse direction. Under the control of the controller 180, the motor 140 switches the direction of rotation from forward to reverse to change the driving direction of the vehicle from forward to reverse.

When the HSG charging control is started, the controller 180 determines whether the battery SOC is less than a second reference value (e.g., 15%) (S140). Herein, the second reference value may be set by the system designer together with the first reference value, and may be set to a value less than the first reference value. When the HSG charging control is started, the controller 180 may determine the HSG charging control mode based on the battery SOC.

When the battery SOC is less than the second reference value, the controller 180 controls the battery charging in the HSG maximum charging mode (S150). When the battery SOC is less than the second reference value, the controller 180 determines that the HSG charging control mode is the HSG maximum charging mode. When the battery SOC is less than the first reference value and less than the second reference value, the controller 180 turns on the engine 110 at the maximum chargeable point to operate the HSG 120 in a regeneration mode in which regeneration control is executed in the HSG so as to charge the battery. The battery 150 is charged using the regenerative energy generated as the motor in the HSG 120 is driven.

While the battery is charged in the HSG maximum charging mode, the controller 180 determines whether a reverse operation is finished (S160). The controller 180 returns to S140 at a predetermined cycle until the reverse operation is finished and determines whether the battery SOC reaches the second reference value. When the battery SOC reaches the second reference value, the controller 180 switches the HSG charging control mode from the HSG maximum charging mode to the HSG maximum efficiency mode.

When the battery SOC is not less than the second reference value in S140, the controller 180 controls the battery charging in the HSG maximum efficiency mode (S170). When the battery SOC is not less than the second reference value, the controller 180 determines that the HSG charging control mode is the HSG maximum efficiency mode. When the battery SOC is less than the first reference value and is not less than the second reference value, the controller 180 operates the engine 110 at the maximum efficiency point to operate the HSG 120, and thus performs the battery charging.

While the battery 150 is charged in the HSG maximum efficiency mode, the controller 180 determines whether a reverse operation is finished (S180). The controller 180 returns to S120 at a predetermined cycle until the reverse operation is finished and determines whether the battery SOC reaches the first reference value.

When the battery SOC is not less than the first reference value in S120, the controller 180 controls the reverse operation of the vehicle in the normal mode (S190). The controller 180 changes the direction of rotation of the motor 140 to change the traveling direction of the vehicle from forward to reverse. At this time, the controller 180 does not operate the HSG 120.

Figure 5:
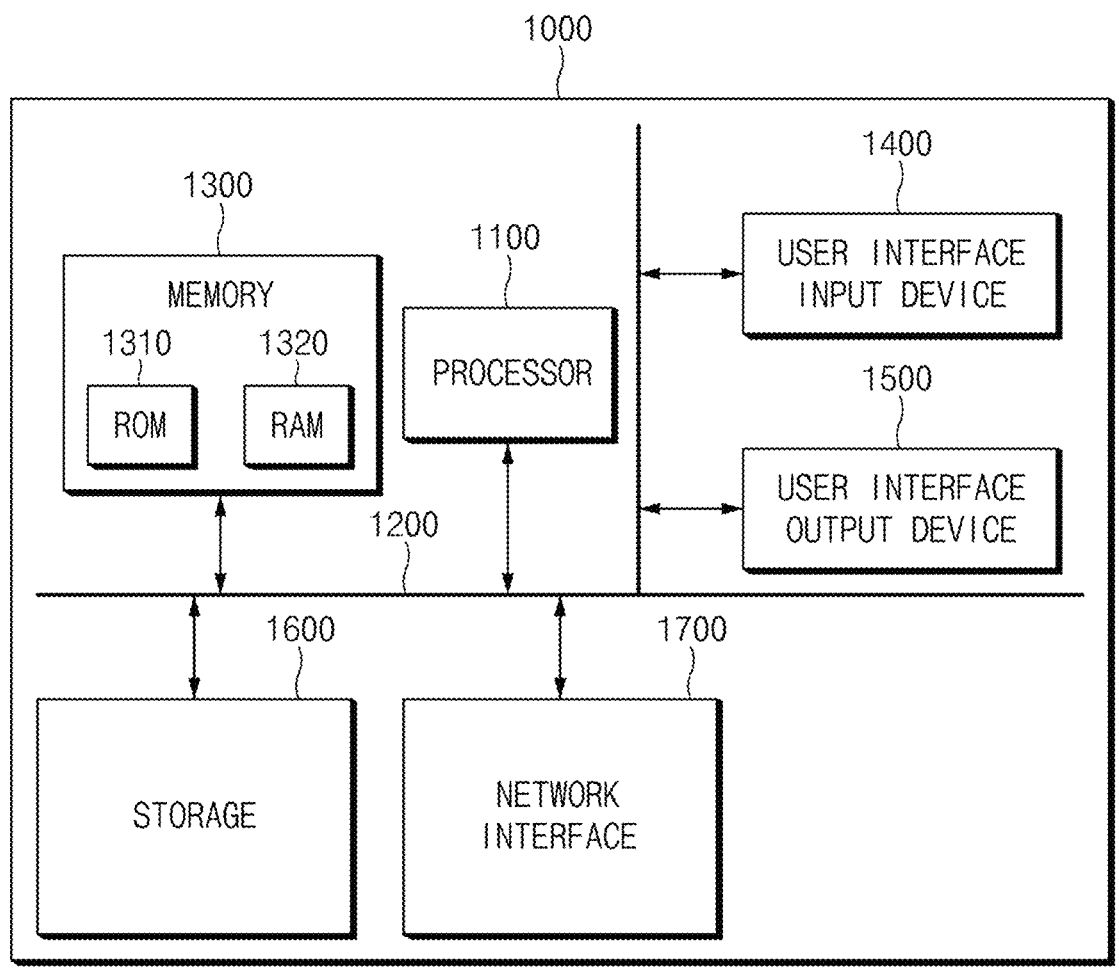
FIG. 5 is a block diagram illustrating a computing system performing a charging control method in one form of the present disclosure.

FIG. 5 is a block diagram illustrating a computing system performing a charging control method according to one form of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

According to one form of the present disclosure, a HEV identifies battery SOC and controls battery charging by changing the charging control strategy of a HSG depending on the SOC level of the battery, upon inputting a reverse gear in the HEV equipped with transmission in which a reverse gear is removed; accordingly, it is possible to improve fuel efficiency by improving energy efficiency, and to secure the performance of a reverse operation for stably performing a reverse operation in various field conditions.

Furthermore, according to another form of the present disclosure, when the SOC of the battery is in a low SOC section, the HSG regeneration charging is operated at the maximum efficiency point, thereby maximizing the charging efficiency and improving fuel efficiency.

Moreover, according to other form of the present disclosure, when the SOC of the battery is in an extremely low SOC section, the HSG regeneration charging is operated at the HSG maximum chargeable point, thereby maximizing the SOC and minimizing the charging time.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A hybrid electric vehicle (HEV) comprising:
    a battery;
    a hybrid starter generator (HSG) configured to start an engine; and
    a controller configured to:
        when a reverse gear input is detected, identify a state of charge (SOC) of the battery,
        when the identified SOC of the battery is less than a first reference value, determine that the battery needs to be charged by the HSG, and
        when the HSG charges the battery, control battery charging in a charging control mode based on a SOC level of the battery,
    wherein when the identified SOC of the battery is less than a second reference value, the controller is configured to determine that the charging control mode is a maximum charging mode.

2. The HEV of claim 1, wherein when the battery needs to be charged by the HSG, the controller is configured to operate the engine and the HSG in a regeneration mode.

3. The HEV of claim 1, wherein the second reference value is set to a value less than the first reference value.

4. The HEV of claim 1, wherein the controller is configured to operate the HSG at a maximum chargeable point during the battery charging in the maximum charging mode.

5. The HEV of claim 1, wherein when the identified SOC of the battery is equal to or greater than the second reference value, the controller is configured to determine that the charging control mode is a maximum efficiency mode.

6. The HEV of claim 5, wherein the controller is configured to operate the HSG at a maximum efficiency point during the battery charging in the maximum efficiency mode.

7. The HEV of claim 5, wherein the controller is configured to determine whether the SOC of the battery reaches the second reference value at a predetermined interval during the battery charging in the maximum charging mode.

8. The HEV of claim 5, wherein when the SOC of the battery reaches the second reference value, the controller is configured to switch to the charging control mode at a maximum chargeable point.

9. A charging control method of a hybrid electric vehicle (HEV), the method comprising:
    identifying, by a controller, a state of charge (SOC) of a battery when a reverse gear input is detected;
    when the identified SOC of the battery is less than a first reference value, determining, by the controller, that the battery needs to be charged by a hybrid starter generator (HSG); and
    when the HSG charges the battery, controlling, by the controller, battery charging in a charging control mode based on a SOC level of the battery,
    wherein controlling the battery charging includes:
        when the SOC of the battery is less than a second reference value, charging the battery in a maximum charging mode.

10. The method of claim 9, wherein determining that the battery needs to be charged by the HSG includes:
    when the HSG charges the battery, operating an engine and the HSG in a regeneration mode.

11. The method of claim 9, wherein the second reference value is set to a value less than the first reference value.

12. The method of claim 9, wherein controlling the battery charging further includes:
    operating the HSG at a maximum chargeable point during the battery charging in the maximum charging mode.

13. The method of claim 12, wherein controlling the battery charging further includes:
    operating the HSG at a maximum efficiency point during the battery charging in a maximum efficiency mode.

14. The method of claim 13, wherein controlling the battery charging further includes:
    determining whether the SOC of the battery reaches the second reference value at a predetermined interval during the battery charging in the maximum charging mode; and
    switching to the charging control mode at the maximum chargeable point when the SOC of the battery reaches the second reference value.

15. The method of claim 9, wherein controlling the battery charging further includes:
    when the identified SOC of the battery is equal to or greater than the second reference value, controlling the battery charging in a maximum efficiency mode.

* * * * *